United States Patent
Mille

(10) Patent No.: US 6,454,407 B2
(45) Date of Patent: Sep. 24, 2002

(54) HINGE ATTACHING DEVICE FOR EYEWEAR FRAME

(75) Inventor: Jacky Mille, Saint Laurent en Grandvaux (FR)

(73) Assignee: Chevassus S.A., Morez (FR)

( * ) Notice: Subject to any disclaimer, the term of this patent is extended or adjusted under 35 U.S.C. 154(b) by 0 days.

(21) Appl. No.: 09/770,139

(22) Filed: Jan. 26, 2001

Related U.S. Application Data

(63) Continuation of application No. PCT/IB99/01321, filed on Jul. 26, 1999.

(30) Foreign Application Priority Data

Jul. 29, 1998 (FR) .............................. 98 09940

(51) Int. Cl.$^7$ ................................................ G02C 5/22
(52) U.S. Cl. ........................................ 351/153; 351/41
(58) Field of Search .......................... 351/41, 153, 140, 351/111, 116; 16/228

(56) References Cited

U.S. PATENT DOCUMENTS 5,793,464 A * 8/1998 Chen .......................... 351/116

FOREIGN PATENT DOCUMENTS

| FR | 1 353 517 | 6/1964 |
| FR | 1 400 466 | 9/1965 |
| FR | 2 358 675 | 2/1978 |
| WO | 96 30800 | 10/1996 |

* cited by examiner

*Primary Examiner*—Hung Xuan Dang
(74) *Attorney, Agent, or Firm*—Henderson & Sturm LLP

(57) ABSTRACT

The invention concerns a device a fixing member associated with the hinge element and anchored by overmoulding in a frame bow or front flank obtained by moulding. Said fixing member comprises a first plate bearing the hinge element, or the housing, and which via a central bridge is linked to a second plate extending substantially parallel to the first. The central bridge extends transversely in said bow or front flank while being completely embedded in the moulded material of said bow or front flank. The second plate projects outside the outer surface of the bow and of the front flank and has a surface forming an ornament.

16 Claims, 2 Drawing Sheets

HINGE ATTACHING DEVICE FOR EYEWEAR FRAME

This is a continuation of PCT/IB99/01321, filed Jul. 26, 1999.

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to attaching devices for a hinge on a molded temple or on the front of an eyeglasses frame.

2. Description of the Prior Art

Of general knowledge are single, nonflexible hinges provided with an attaching device in the form of at least one clamp that, taken as a whole, is T-shaped. At the time of the molding of the temple or of the front, the entire hinge-attachment element is provided at the end of the temple or of the front and the attachment element is thus double-molded by the molding compound so as to fasten the hinge element to this temple or the front of the frame.

The manufacture by molding of a temple or a front is well known in the technical field and will not be explained herein in detail.

BRIEF SUMMARY OF THE INVENTION

Also known are flexible hinges wherein the hinge of the temple is linked to a spring mechanism placed in a casing box.

This housing is welded onto a T-shaped element, similar to the shape of the non-flexible hinge attachment. In the molding process of the temple, the T-shaped attaching device is embedded in the molding compound, which ensures the securing of the housing that remains disengaged on the inner face of the temple.

The spring mechanism can be either of sliding type or of rod type well known in the technique. This elastic mechanism is installed in a housing formed by a covering cap and it is linked to the temple hinge that can thus move because of the spring action of the mechanism, while the front hinge element is rigidly fastened to one end of the front of the frame.

In the case of the flexible hinges, the casing box constituting the housing for the spring mechanism can also be produced by the MIM (from the English Metal Injection Moulding) technique that is a process of injection molding of a compound of a metal powder and a thermoplastic bonding material in a mold. The MIM fabrication technique of such a casing box for an flexible hinge is described in document EP-A-0 817 967 and will not be explained in more detail.

The known hinge attaching devices cannot be used on relatively thin temples or frame fronts because it is necessary that they be of a certain thickness so that the attachment element be securely fastened. Furthermore, the temple hinge attaching device for flexible hinges is relatively complicated to use because it is also necessary to conduct an operation consisting in securing the casing box to the T-shaped attachment element.

The invention has the aim to remedy these disadvantages by presenting a hinge attaching device that is generally easy to use, above all, for the flexible hinges and, in particular, suitable to be used for thin temples or frame fronts. The attaching device in accordance with the invention presents an additional advantage because of the fact that it may be ornamental without the necessity of having to add other parts.

The object of the invention is a hinge attachment element for eyewear frames, comprised by an attaching device associated with the hinge element and secured by double molding on a temple or frame front obtained buy molding, characterized in that the attaching device is constituted by a first plaque provided with the hinge element and which, by means of a central bridge, is connected to a second plaque; this central bridge extends transversally along said temple or frame front, being fully immersed in the molding compound of said temple or front of the frame.

In accordance with other advantageous characteristics of the invention:

- said second plaque protrudes laterally beyond the external face of said front of the eyeglasses frame;
- said second plaque presents towards the outside an ornamental surface;
- said central bridge is pierced for an improved holding of the molding compound;
- the plaques present a peripheral surface to obtain the tightness of the temple or of the front of the frame;
- said first plaque is directly linked to the hinge element;
- said first plaque is attached to the hinge element by means of a spring-actuated mechanism housed in a casing box linked to the first plaque;
- the casing box is cast molded with said attaching device;
- the casing box of the spring-actuated mechanism is constituted by a covering cap mounted on and affixed to the surface of said first plaque;
- said attaching device is produced by using the MIM technique;
- said attaching device and the casing box are produced in one only piece by the MIM technique.

Some other characteristics and advantages of the invention can be gathered from the description that is given, by way of example, of some other embodiments, making reference to the attached illustrations in which:

DETAILED DESCRIPTION OF THE INVENTION

Figure 1:
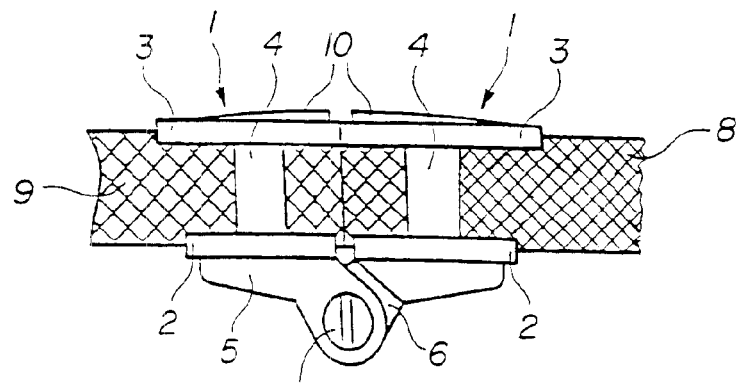
FIG. 1 is a partial cutaway lateral view showing two devices in accordance with the invention for the attaching of temple and front hinge elements of a non-flexible hinge.
Figure 2:
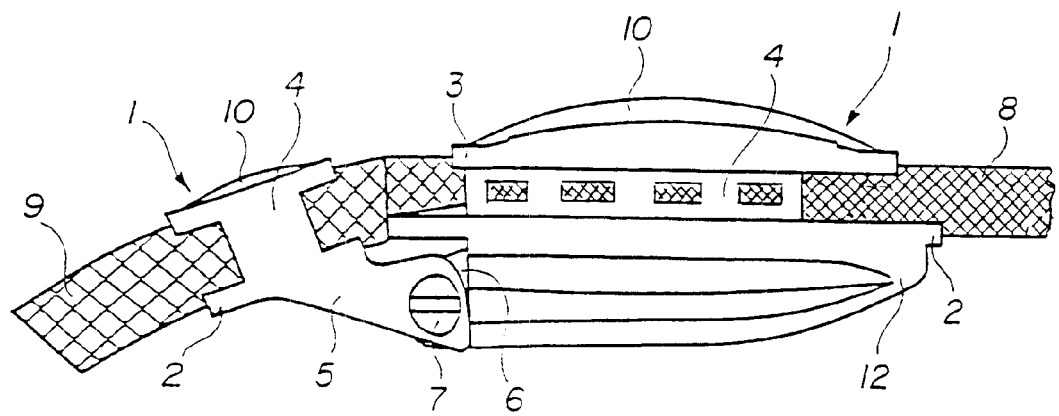
FIG. 2 is a partial cutaway lateral view showing two attaching devices in accordance with the invention, one of which is linked to a casing box of a spring-actuated hinge while the other one is linked to a hinge element for the front of the frame.
Figure 3:
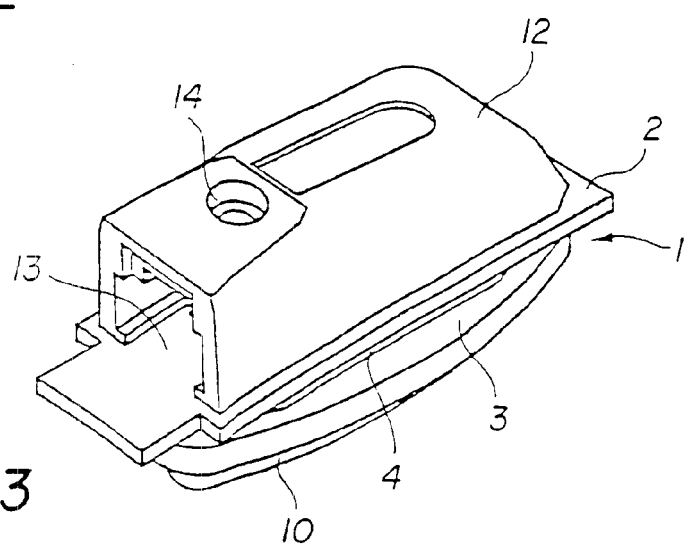
FIG. 3 is a perspective view of an attaching device in accordance with the invention linked to a casing box for the housing of a mechanism for a spring-actuated hinge.
Figure 4:
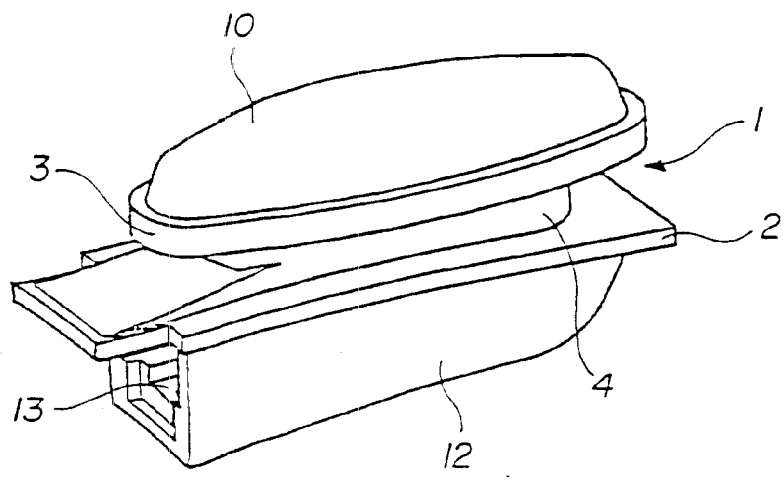
FIG. 4 is a perspective view of the attaching device illustrated in FIG. 1, turned 180°.
Figure 5:
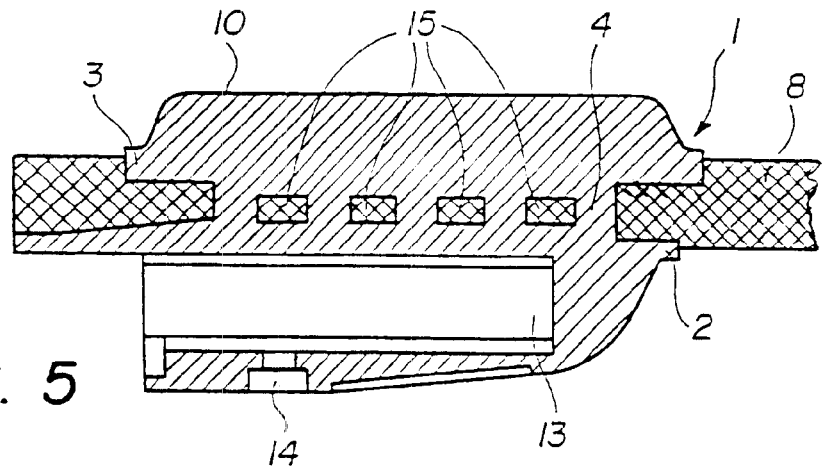
FIG. 5 is a longitudinal section view of the attaching device illustrated in FIGS. 3 and 4, mounted on an end of a temple.
Figure 6:
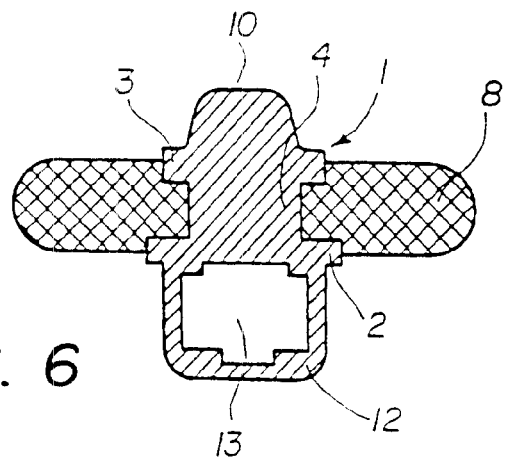
FIG. 6 is a transversal section view of the device and the temple illustrated in FIG. 5.

FIG. 1 illustrates two attaching devices in accordance with the invention adapted to a non-flexible hinge. Each attaching device comprises a hinge attachment element 1, which device is provided with a first plaque 2 and a second plaque 3 that are joined to each other by means of a central bridge 4. These two plaques are approximately parallel to each other.

The attachment element 1 of one of these devices is affixed to two hinges on the front of the frame, that constitute a female hinge while the attachment element of the other device is affixed to the temple hinge 6 that forms the male hinge. The temple hinge 6 is affixed in a customary manner to the frame front hinges 5 by means of a half-dog point screw 7 to form the joint between the temple 8 and the front 9 of the frame.

At the time of the molding of the temple 8, and in an analogous manner when molding the front 9, the corresponding hinge-attachment element assembly is placed in the mold in such a manner that the central bridge 4 extends transversally along the temple, perpendicular to its longitudinal axis. The central bridge is completely immersed in the molding compound. At the time of the molding, it is necessary to ensure the tightness of the molding of the two sides of the temple or of the front of the frame. In order to accomplish this, the first and second plaques 2, 3 are not immersed in the compound, but they protrude slightly on the two sides of the external and inner surfaces of the temple. The tightness is ensured on the periphery of the first and second plaques 2, 3. The molding compound rises thus slightly on the peripheries of the plaques without, however, covering them.

Thu, the second plaque 3, that has the sole purpose of attaching the hinge element, whereas it is fastened to the first plaque, protrudes laterally beyond the external surface of the temple, thus presenting a surface that advantageously constitutes an ornament 10, that can be used for a design, for a trademark, etc.

Although the hinge elements with the attaching devices in accordance with the invention can be manufactured by machining, they are preferably produced by the above-mentioned MIM technique, which consists in mixing a bonding material with a metallic powder of a very fine granulometry, in injecting this mixture into a mold and to expel the bonding material by means of disintegration and evaporation to obtain a blank of the desired shapes and that is subsequently sintered which, after a certain shrinkage, gives it the final shape. This is a technique that at present is fully mastered and particularly well suited for the manufacture of small parts having complex shapes of relatively high precision. Thus, by this type of molding it is possible to obtain different designs on the ornament.

FIGS. 2 to 6 show another embodiment applied to a spring-actuated hinge. The elements analogous to those previously described in the embodiment of FIG. 1 are designated with the same references.

The attaching device for the temple hinge element 5 is practically identical to the one described in regards to FIG. 1, whereas in the embodiment illustrated in FIGS. 2 to 6 the attaching device of the temple hinge element 6 is affixed to a casing box 12 that is provided with a housing 13 for the spring mechanism of the spring-actuated hinge. The details of the spring-actuated mechanism are not described because they are well known and do not directly relate to the present invention. It is merely recalled that this mechanism allows the hinge element to move by translation when the temple is turned either to the inside or to the outside, in order to thus bring the temple in an elastic manner to one of the two constant positions, namely, folded (not in use) or unfolded (in use). This mechanism allows an angular movement of the temple towards the outside beyond the position of "utilization." Such hinges contribute an element of comfort to the wearing of glasses because the temples lie against the sides of face with a reasonable pressure.

The casing box can be constituted by a covering cap mounted on and affixed to the surface of the first plaque by soldering but preferably, and as it is the case of the illustrated embodiment, the casing box 13 is of a compound, namely, of one only piece with the attaching device and, to be more precise, it is affixed to the first plaque 2 of the attaching device 1. The casing box can be part of a single-piece unit, machined after having been obtained in a standard manner by machining and cold headed, but it is preferably shaped from one piece obtained by the MIM technique. To form the housing of the casing box it suffices to incorporate a spindle into the MIM.

Thus can be obtained a housing that is open on one side for the insertion of the spring mechanism that must be solidly affixed, for example, by means of a screw screwed into a hole 14 and interacting with an element constituting a catch for the spring of the mechanism.

Further, in the examples illustrated in FIGS. 2 to 6, the central bridge is of elongated shape and it is pierced by holes that are regularly arranged and aligned with respect to each other. These holes improve the setting of the molding compound when molding the temple.

Other variants can be envisaged without, however, deviating from the scope of the invention.

Thus is obtained an attaching device that provides an extremely reliable fixation on a temple or the front of an eyewear frame, that is particularly well adapted for the manufacture of thin temples and that, additionally, presents an outer surface that could be ornamental.

What is claimed is:

1. A procedure for the manufacturing of a temple or of the front of an eyewear frame by means of molding, in which one doublemolds a hinge attachment element by providing a central bridge of the attachment element transversally along said temple or front to immerse it in the molding compound of the temple and the front of the frame and by providing a first plaque to which is affixed the hinge element, protruding with respect to a inner surface of the temple or of the front, characterized in that there is provided a second plaque mounted on the central bridge, laterally protruding from said temple or said front of the frame.

2. A procedure in accordance with claim 1, characterized in that one pierces said central bridge to improve the holding of the molding compound.

3. A temple or front of frame manufactured in accordance with claim 2, characterized in that said second plaque presents toward the outside a surface constituting an ornament.

4. A temple or front of frame manufactured in accordance with claim 1, characterized in that said second plaque presents toward the outside a surface constituting an ornament.

5. A temple or front of frame in accordance with claim 4, characterized in that said first plaque is directly joined to the hinge element.

6. A temple or front of frame in accordance with claim 5, characterized in that this attachment element is manufactured by the MIM method.

7. A temple or front of frame in accordance with claim 4, characterized in that said first plaque is joined to the hinge element by means of a spring-actuated mechanism housed in a casing box affixed to said first plaque.

8. A temple or front of frame in accordance with claim 7, characterized in that this casing box is molded with the attachment element.

9. A temple or front of frame in accordance with claim 8, characterized in that this attachment element is manufactured by the MIM method.

10. A temple or front of frame in accordance with claim 8, characterized in that said attachment element and the casing box are produced in one only piece by means of the MIM method.

11. A temple or front of frame in accordance with claim 7, characterized in that the casing box of the spring-actuated mechanism is a housing constituted by a covering cap mounted on and affixed to the surface of said first plaque.

12. A temple or front of frame in accordance with claim 11, characterized in that this attachment element is manufactured by the MIM method.

13. A temple or front of frame in accordance with claim 7, characterized in that this attachment element is manufactured by the MIM method.

14. A temple or front of frame in accordance with claim 4, characterized in that this attachment element is manufactured by the MIM method.

15. A temple or front of frame in accordance with claim 14, characterized in that said attachment element and the casing box are produced in one only piece by means of the MIM method.

16. A temple or front of frame in accordance with claim 4, characterized in that said attachment element and the casing box are produced in one only piece by means of the MIM method.

* * * * *